(12) United States Patent
Tamura et al.

(10) Patent No.: US 10,078,332 B2
(45) Date of Patent: Sep. 18, 2018

(54) SHIP HANDLING DEVICE

(71) Applicant: YANMAR CO., LTD., Osaka-shi, Osaka (JP)

(72) Inventors: Gakuji Tamura, Osaka (JP); Jun Watanabe, Osaka (JP); Hiroaki Wakahara, Osaka (JP); Naohiro Hara, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/519,939

(22) PCT Filed: Aug. 20, 2015

(86) PCT No.: PCT/JP2015/073430
§ 371 (c)(1),
(2) Date: Apr. 18, 2017

(87) PCT Pub. No.: WO2016/063606
PCT Pub. Date: Apr. 28, 2016

(65) Prior Publication Data
US 2017/0351259 A1 Dec. 7, 2017

(30) Foreign Application Priority Data
Oct. 23, 2014 (JP) .................. 2014-216749

(51) Int. Cl.
G05D 1/02 (2006.01)
B63H 25/02 (2006.01)
(Continued)

(52) U.S. Cl.
CPC ......... G05D 1/0206 (2013.01); B63H 21/213 (2013.01); B63H 25/02 (2013.01);
(Continued)

(58) Field of Classification Search
CPC ...... G05D 1/0206; B63H 25/42; B63H 25/02; B63H 21/213; B63H 2025/026; B63J 2099/008
See application file for complete search history.

(56) References Cited

U.S. PATENT DOCUMENTS 8,417,399 B2 4/2013 Arbuckle et al.
8,478,464 B2 7/2013 Arbuckle et al.
(Continued)

FOREIGN PATENT DOCUMENTS

JP H01314911 A 12/1989
JP H09104397 A 4/1997
(Continued)

OTHER PUBLICATIONS

International Search Report corresponding to Application No. PCT/JP2015/073430; dated Nov. 2, 2015, with English translation.

Primary Examiner — Rodney Allen Butler
(74) Attorney, Agent, or Firm — Cantor Colburn LLP

(57) ABSTRACT

A ship handling device may be provided with which a ship moves and turns in a target orientation toward target coordinates without monitoring the behavior of the ship against disturbance or the characteristics of the ship. The ship handling device moves the ship toward the target coordinates and in the target orientation from a GPS device and a signal from an orientation sensor, wherein the target coordinates and the target orientation are calculated from operation of a joystick lever, and a thrust is generated by a propulsion device so as to move the ship to the target coordinates and the target orientation after a signal finalizing the target coordinates and the target orientation has been acquired.

4 Claims, 16 Drawing Sheets

(51) Int. Cl.
   *B63H 21/21*      (2006.01)
   *B63H 25/42*      (2006.01)
   *B63J 99/00*      (2009.01)

(52) U.S. Cl.
   CPC ....... *B63H 25/42* (2013.01); *B63H 2025/026* (2013.01); *B63J 2099/008* (2013.01)

(56) References Cited

U.S. PATENT DOCUMENTS

| | | |
|---|---|---|
| 8,700,238 B2 | 4/2014 | Hiramatsu |
| 2007/0089654 A1* | 4/2007 | Bradley ................ B63H 21/22 114/10 |
| 2011/0153125 A1 | 6/2011 | Arbuckle et al. |
| 2011/0153126 A1 | 6/2011 | Arbuckle et al. |
| 2011/0166724 A1 | 7/2011 | Hiramatsu |

FOREIGN PATENT DOCUMENTS

| | | |
|---|---|---|
| JP | H10109693 A | 4/1998 |
| JP | 2002234494 A | 8/2002 |
| JP | 2004352007 A | 12/2004 |
| JP | 2006327215 A | 12/2006 |
| JP | 2008222082 A | 9/2008 |
| JP | 2011140272 A | 7/2011 |
| JP | 2011169801 A | 9/2011 |

\* cited by examiner

SHIP HANDLING DEVICE

CROSS REFERENCE TO RELATED APPLICATIONS

This is the U.S. national stage of application No. PCT/JP2015/073430, filed on Aug. 20, 2015. Priority under 35 U.S.C. § 119(a) and 35 U.S.C. § 365(b) is claimed from Japanese Application No. 2014-216749, filed on Oct. 23, 2014, the disclosures of which are also incorporated herein by reference.

TECHNICAL FIELD

The present invention relates to a ship handling device.

In one conventionally known ship (shaft ship), driving force is transmitted from an engine, provided in a ship body, to a forward-rearward travelling propeller, provided outside the ship body, via a switching clutch and a propeller shaft. Furthermore, in another known ship, a side thruster is provided for causing the ship to laterally move left or right to achieve higher operability at the time of docking or the like. The side thruster includes a propeller provided around the center of a bow side in a left and right direction so that thrust is generated in the left and right direction. Thus, the ship is configured to be laterally movable by the side thruster, whereby positioning control (position determining control) can be easily performed for a docking operation or the like.

The positioning of the ship body of the ship with such a configuration involves a complicated ship handling operation because the operation needs to be performed in accordance with influence between the side thruster and the forward-rearward travelling propeller. Thus, in one known ship, the side thruster and the forward-rearward travelling propeller can be controlled in an interlocked manner with a joystick lever so that a simple ship handling operation can be achieved. Patent Literature 1 discloses an example of this configuration.

The ship described in Patent Literature 1 features the joystick lever with which propulsion devices can be easily interlocked for performing the ship handling. Unfortunately, the technique in the patent literature fails to cover a deviation due to an influence of a disturbance such as a water flow and wind and an influence of inertial force (way). An operation on the joystick lever, for stopping the ship at a desired position, needs to be performed in accordance with the influence of the disturbance and the influence of the inertial force (way), meaning that the behavior of the ship and the characteristics of the ship with respect to the disturbance need to be recognized.

CITATION LIST

Patent Literature

PTL 1: Japanese Unexamined Patent Application Publication No. 2008-222082 A

SUMMARY OF INVENTION

Technical Problem

The present invention is made in view of the above, and an object of the present invention is to provide a ship handling device that can make a ship move to target coordinates and turn to a target orientation without recognizing a behavior of the ship or characteristics of the ship with respect to disturbances.

Solution to Problem

A solution to the problem of the present invention described above is described below.

Specifically, in the present invention, a ship handling device configured to make a ship move to target coordinates and turn to a target orientation based on a signal from a GPS device and a signal from an orientation sensor. The ship handling device is configured to calculate the target coordinates and the target orientation based on an amount of operation on an operating tool, set a movement control stop zone based on the target coordinates, set a turn control stop zone based on the target orientation, make the ship move toward the target coordinates and turn to the target orientation after acquiring a signal finalizing the target coordinates and the target orientation, and control the ship in such a manner that, when current coordinates calculated from the signal from the GPS device are in the movement control stop zone and a current orientation calculated from the signal from the orientation sensor is in the turn control stop zone, the current coordinates and the current orientation are maintained.

In the present invention, the current coordinates and the current orientation of the ship may be displayed on a display device. The target coordinates and the target orientation may be displayed on the display device in accordance with the amount of operation on the operating tool. The target coordinates displayed may be changed in accordance with a movement of the ship. The target orientation displayed may be changed in accordance with a turning of the ship.

In the present invention, one graphic representing the current coordinates and the current orientation may be displayed, and another graphic representing the target coordinates and the target orientation may be displayed.

Advantageous Effects of Invention

The present invention provides the following advantageous effects.

In the present invention, position control for a ship is performed after target coordinates and a target orientation are set. Thus, only current coordinates and a current orientation of the ship as well as the target coordinates and the target orientation of the ship need to be recognized. Thus, the ship can be moved to the target coordinates and turned to the target orientation without recognizing the behavior of the ship and the characteristics of the ship with respect to a disturbance.

BRIEF DESCRIPTION OF DRAWINGS

FIG. 8B-1 is a diagram illustrating an operation mode of the ship in a buffer zone, FIG. 8B-2 is a diagram illustrating an operation mode of the ship in the buffer zone under a predetermined condition.

FIG. 11B-1 is a diagram illustrating an operation mode of the ship in the buffer zone, FIG. 11B-2 is a diagram illustrating an operation mode of the ship in the buffer zone under a predetermined condition.

DESCRIPTION OF EMBODIMENTS

Figure 1:
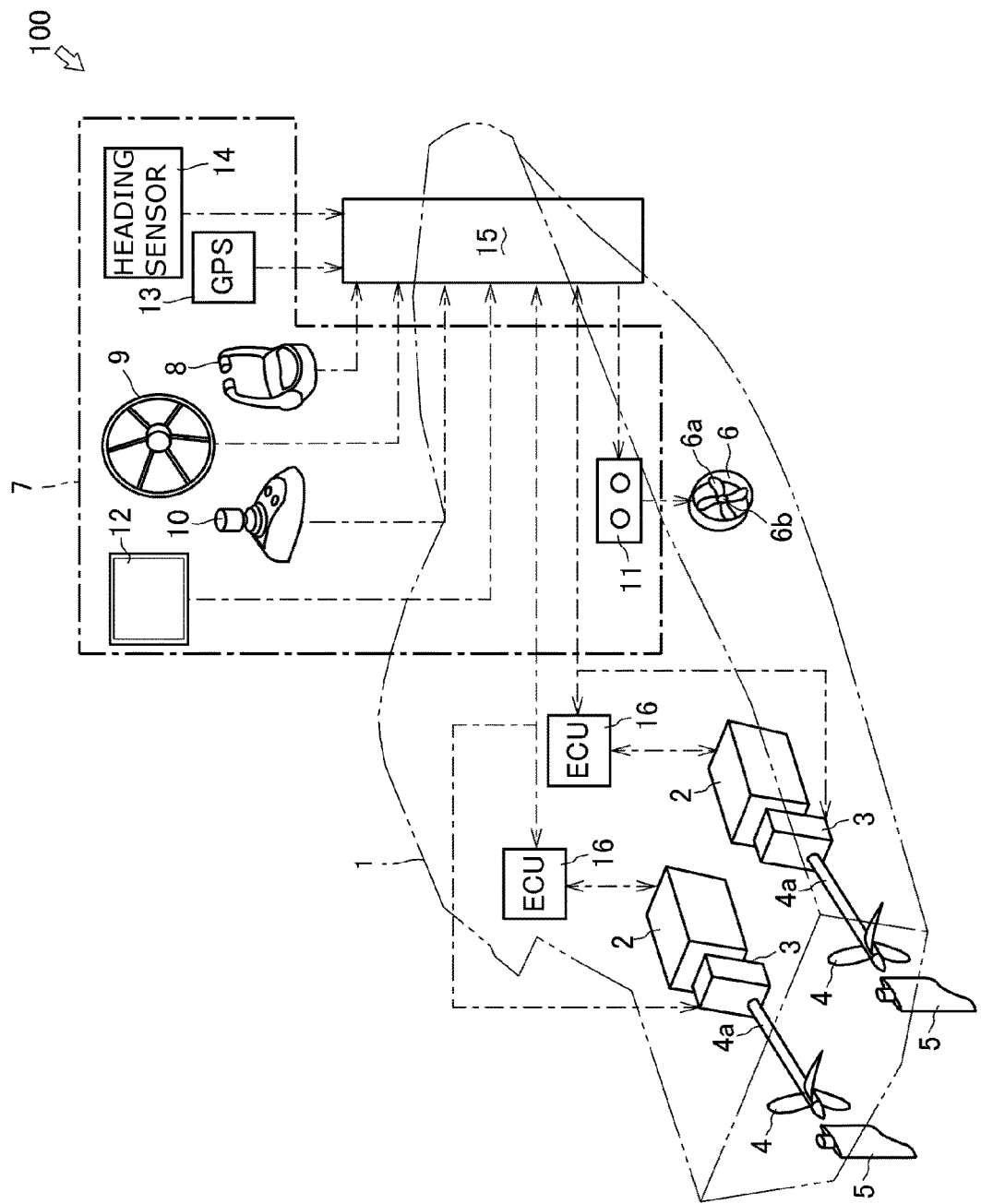
FIG. 1 is a schematic view illustrating an overview of a ship including a ship handling device according to the present invention.

First of all, an overview and a configuration of a ship 100 as one embodiment of the present invention are described with reference to FIG. 1 to FIG. 3. The ship 100 illustrated in FIG. 1 is what is known as a twin-screw ship (shaft ship). However, the number of propeller shafts and the number of propulsion devices are not limited to those in this configuration. Other configurations including a plurality of shafts and employing an outdrive system may be employed. In the present embodiment, a front and rear direction and a left and right direction are defined with a bow direction of the ship 100 defied as the front.

Figure 2:
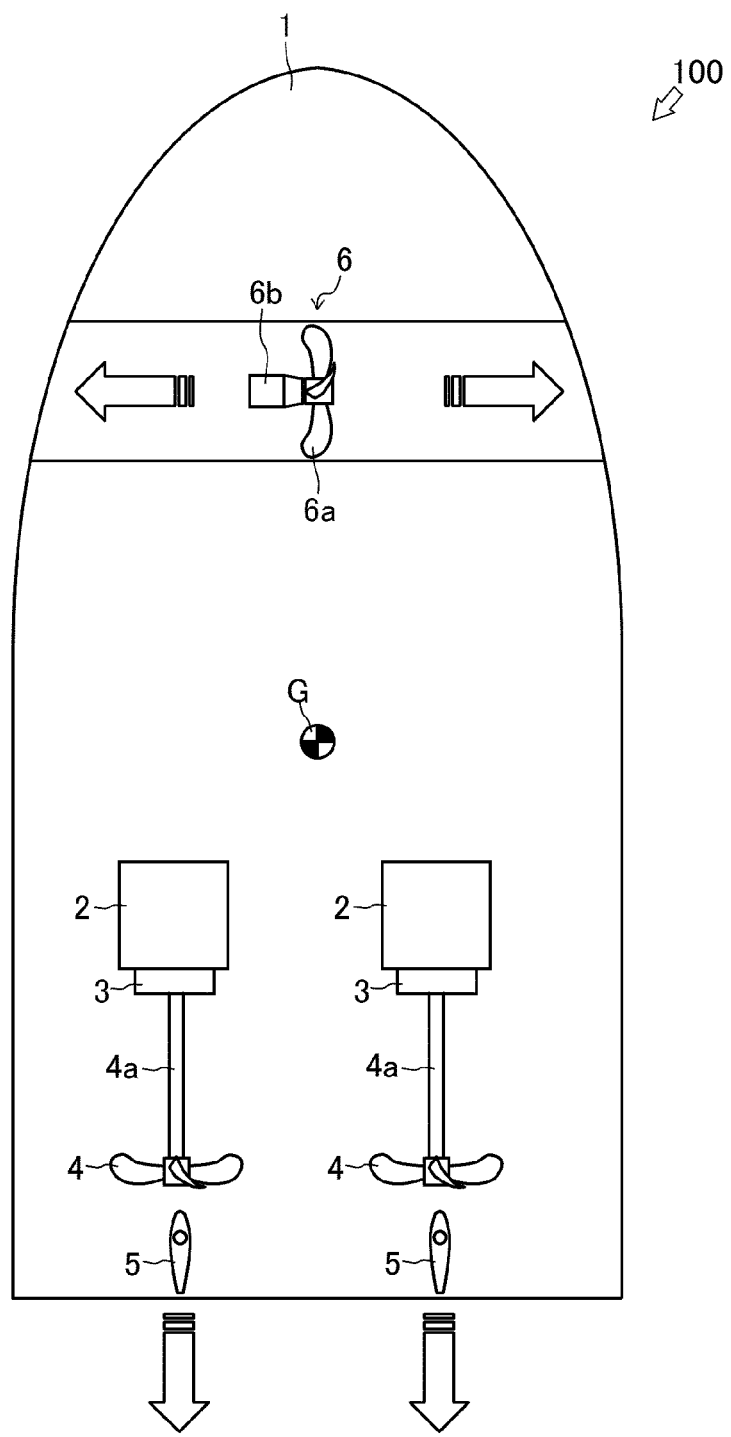
FIG. 2 is a schematic plan view illustrating an arrangement of a side thruster and forward-rearward travelling propellers of the ship including the ship handling device according to the present invention.

As illustrated in FIG. 1 and FIG. 2, the ship 100 is a shaft ship in which driving force from engines 2 is transmitted to forward-rearward travelling propellers 4 via propeller shafts 4a. The ship 100 has a ship body 1 provided with a propulsion device including the engines 2, switching clutches 3, forward-rearward travelling propellers 4, rudders 5, a side thruster 6, and ECUs 16, as well as a ship handling device 7 including an acceleration lever 8, a steering wheel 9, a joystick lever 10, a side thruster controller 11, a monitor 12, a GPS device 13, a heading sensor (orientation sensor) 14, and a ship handling control device 15. The ship 100 is not limited to the shaft ship with the propulsion devices provided on a port side and a starboard side as in the present embodiment, and may be a stern drive ship or the like.

The two engines 2 each generate driving force for rotating a corresponding one of the forward-rearward travelling propellers 4 on the port side and the starboard side. The engines 2 are respectively disposed on a port rear side and a starboard rear side of the ship body 1. The engines 2 each have an output shaft to which a corresponding one of the switching clutches 3 is connected.

The two switching clutches 3 switch the driving force, transmitted from the output shafts from the engines 2, between a normal rotation direction and a reverse rotation direction, and output the resultant driving force. The switching clutch 3 has an input side connected to the output shaft of the engine 2. The switching clutches 3 each have an output side connected to a corresponding one of the propeller shafts 4a. Thus, the switching clutch 3 is configured to transmit the driving force from the engine 2 to the propeller shaft 4a.

The two forward-rearward travelling propellers 4 generate thrust in the front and rear direction. The forward-rearward travelling propellers 4 are respectively connected to the two propeller shafts 4a provided through the bottom of the ship body 1 on the port side and the starboard side to extend outside the ship. The forward-rearward travelling propellers 4 are drivingly rotated by the driving force transmitted thereto through the propeller shafts 4a from the engines 2, and the pulsation force is generated with a plurality of blades, arranged around the rotation shafts, rotating in water in the periphery.

The two rudders 5 change the direction of a water flow generated by the forward-rearward travelling propellers 4 drivingly rotated. The rudders 5 are respectively at a port side ship bottom rear end (stern side) and at a starboard side bottom rear end (stern side) of the ship body 1 on the rear side of the forward-rearward travelling propellers 4. The rudder 5 is configured to be pivotable within a predetermined angle range in a left and right direction about pivoting shaft provided on the ship body 1. The rudders 5 are coupled to the steering wheel 9 in an interlocking manner. Thus, the rudders 5 are configured in such a manner that when the steering wheel 9 is operated to make a rudder rear end portion directed rightward of the ship body 1, the thrust generated by the water flow makes the stern of the ship 100 pressed leftward and a bow side directed rightward. Similarly, the rudders 5 are configured in such a manner that when the steering wheel 9 is operated to make the rudder rear end portion directed leftward of the ship 100, the thrust generated by the water flow makes the stern of the ship 100 pressed rightward and the bow side directed leftward.

The side thruster 6 generates thrust in the left and right direction. The side thruster 6 is disposed on the bow side of the ship body 1 and at the center in the left and right direction. The side thruster 6 includes a propeller 6a and a motor 6b. The motor 6b is connected to the side thruster controller 11, and is configured to be rotatable at a desired rotation speed. The side thruster 6 is configured in such a manner that the propeller 6a generates the thrust in the left and right direction of the ship body 1. The side thruster 6 drives the motor 6b based on a signal from the side thruster controller 11, whereby the propeller 6a is rotated so that the thrust of a desired magnitude is generated in the left and right direction.

The acceleration lever 8 as a part of the ship handling device 7 generates a signal indicating the rotation speed of the forward-rearward travelling propeller 4 on the port side, the rotation speed of the forward-rearward travelling propeller 4 on the starboard side, as well as their rotation direction. The acceleration lever 8 includes a lever corresponding to the forward-rearward travelling propeller 4 on the port side and a lever corresponding to the forward-rearward travelling propeller 4 on the starboard side. Thus, the acceleration lever 8 is configured to generate the signals for the forward-rearward travelling propeller 4 on the port side and for the forward-rearward travelling propeller 4 on the starboard side independently from each other. The acceleration lever 8 is configured to be inclined in the front and rear direction of the ship 100 by a desired angle. The acceleration lever 8 is configured to generate a signal indicating the rotation speed of the engines 2 and a signal indicating a corresponding switching state of the switching clutch 3 independently from each other, in accordance with the operation direction and the amount of the operation. The acceleration lever 2 generates a signal for causing the forward-rearward travelling propellers 4 to generate the thrust with which the ship 100 travels forward when operated to be inclined forward, and generates a signal for causing the forward-rearward travelling propellers 4 to generate the thrust with which the ship 100 travels rearward when operated to be inclined rearward.

The steering wheel 9 as a part of the ship handling device 7 is used for changing the pivot angle of the rudders 5. The steering wheel 9 is coupled to the rudders 5 on the port side and on the starboard side in an interlocking manner via a wire link mechanism or a hydraulic circuit. When the steering wheel 9 is rotationally operated rightward, the rudders 5 pivot to have the rear ends directed rightward. Thus, the water flow generated by the forward-rearward travelling propellers 4 is directed rightward so that the ship 100 has the stern propelled leftward to have the bow side directed rightward. Similarly, when the steering wheel 9 is rotationally operated leftward, the rudders 5 pivot to have the rear ends directed leftward. Thus, the water flow generated by the forward-rearward travelling propellers 4 is directed leftward so that the ship 100 has the stern propelled rightward to have the bow side directed leftward.

Figure 3:
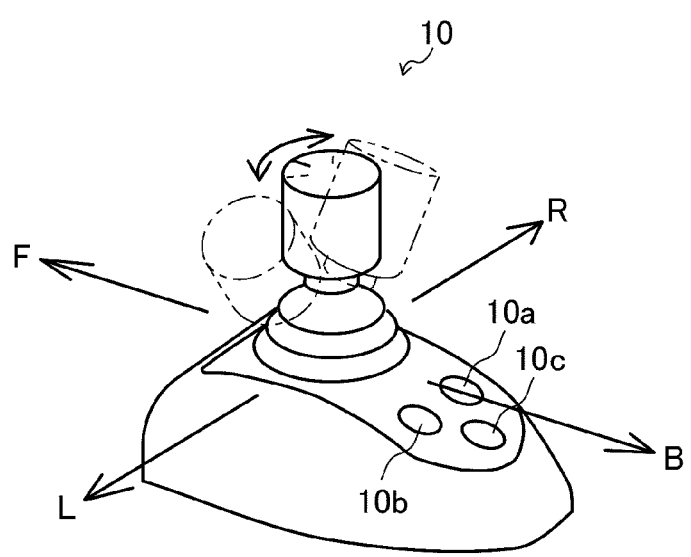
FIG. 3 is a perspective view illustrating a configuration of a joystick lever of the ship handling device according to the present invention.

As illustrated in FIG. 1 and FIG. 3, the joystick lever 10 as a part of the ship handling device 7 generates a signal for causing the ship 100 to move in a desired direction. The joystick lever 10 is configured to be capable of being inclined in a desired direction by a desired angle. The joystick lever 10 can be operated to be rotated by a desired angle about a lever shaft. The joystick lever 10 is configured to generate: a signal indicating the rotation speed of the engine 2 and the switching state of the switching clutch 3 in accordance with the operation mode and the amount of operation; and a signal indicating the rotation speed and the rotation direction of the side thruster 6, independently from each other. More specifically, the joystick lever 10 operated to be inclined in a desired direction generates a signal for the forward-rearward travelling propellers 4 on both sides and for the side thruster 6, to cause the ship 100 to move in the direction corresponding to the operation with the thrust corresponding to the amount of the operation. The joystick lever 10 operated to rotate about the lever shaft generates a signal for the forward-rearward travelling propellers 4 on both sides and for the side thruster 6, to cause the ship 100 to turn in a desired direction with the thrust corresponding to the amount of the operation.

The joystick lever 10 is provided with: a positioning switch 10a for setting target coordinates for positioning control described later; a movement switch 10b for starting the movement of the ship 100 to the target coordinates; and a change switch 10c for changing various settings. The positioning switch 10a generates a positioning control start signal. The movement switch 10b generates a movement signal for causing the movement of the ship 100 toward the target coordinates set by operating the joystick lever 10. The change switch 10c generates a signal for changing a control condition related to positioning for the ship 100.

The side thruster controller 11 as a part of the ship handling device 7 is used for driving the side thruster 6. When the side thruster controller 11 is operated to turn ON, the motor 6b of the side thruster 6 is rotated in a desired rotation direction in such a manner that the propeller 6a of the side thruster 6 generates the thrust in the left and right direction.

The Global Positioning System (GPS) device 13 as a part of the ship handling device 7 measures (calculates) the positional coordinates of the ship 100. The GPS device 13 receives a signal from a plurality of GPS satellites to calculate the positional coordinates of the ship 100 and outputs latitude La(n) and longitude Lo(n) representing the current position. More specifically, the GPS device 13 calculates absolute values of the positional coordinates of the ship 100.

The heading sensor 14, which is an orientation sensor, as a part of the ship handling device 7 measures (calculates) the direction of the ship 100. The heading sensor 14 calculates the orientation of the bow of the ship 100 based on the terrestrial magnetism. More specifically, the heading sensor 14 calculates the absolute orientation of the bow of the ship 100.

The ECU 16 illustrated in FIG. 1 controls the engine 2. The ECU 16 stores various programs and data for controlling the engine 2. The ECU 16 is provided to each of the engines 2. The ECU 16 may have a configuration in which a CPU, a ROM, a RAM, and an HDD are connected to each other through a bus, or may have a configuration including a one-chip LSI and the like.

The ECU 16 is connected to a fuel adjustment valve for a fuel supply pump, a fuel injection valve, various sensors, and the like that are unillustrated components of the engine 2, and is capable of controlling a supplied amount with the fuel adjustment valve and opening/closing of the fuel injection valve and of acquiring information detected by various sensors.

The ship handling control device 15 as a part of the ship handling device 7 controls the engine 2, the switching clutch 3, and the side thruster 6 based on a detected signal from the acceleration lever 8, the steering wheel 9, the joystick lever 10, and the like. The ship handling control device 15 may be configured to be capable of implementing what is known as automatic navigation in which the ship is automatically handled with a route calculated from the current position and the set destination, based on the information from the GPS device 13.

The ship handling control device 15 stores various programs and data for controlling the engine 2, the switching clutch 3, and the side thruster 6. The ship handling control device 15 may have a configuration in which a CPU, a ROM, a RAM, and an HDD are connected to each other through a bus, or may have a configuration including a one-chip LSI and the like.

The ship handling control device 15 is connected to each of the switching clutches 3 and the ECU 16 for each of the engines 2, and can acquire various signals indicating a state of each of the switching clutches 3, the starting state of each of the engines 2, and the engine rotation speed N and various signals acquired by the ECU 16 from the various sensors.

The ship handling control device 15 can transmit a signal, for changing (switching) a clutch state, to each of the switching clutches 3.

The ship handling control device 15 can transmit a signal for controlling the fuel adjustment valve and the fuel injection valve of the fuel supply pump as well as various other devices of the engine 2, to the ECU 16.

The ship handling control device 15 is connected to the acceleration lever 8 and the joystick lever 10, and can acquire signals from the acceleration lever 8 and the joystick lever 10.

The ship handling control device 15 is connected to the side thruster controller 11 for the side thruster 6 and can transmit a signal for controlling the side thruster 6.

The ship handling control device 15 is connected to the GPS device 13 and the heading sensor 14, and can acquire the absolute coordinates and the absolute orientation of the ship 100.

The ship handling control device 15 is connected to the monitor 12, and can display the current position of the ship 100 and a ship handling status achieved with the joystick lever 10.

The positioning control (position control) performed by the ship handling control device 15 in the ship 100 as one embodiment of the ship according to the present invention is described with reference to FIGS. 4A AND 4B and FIG. 5. The positioning control is for making the ship 100 move to a desired coordinate position with the bow orientated in a desired orientation, and for maintaining the position.

Figure 4A:
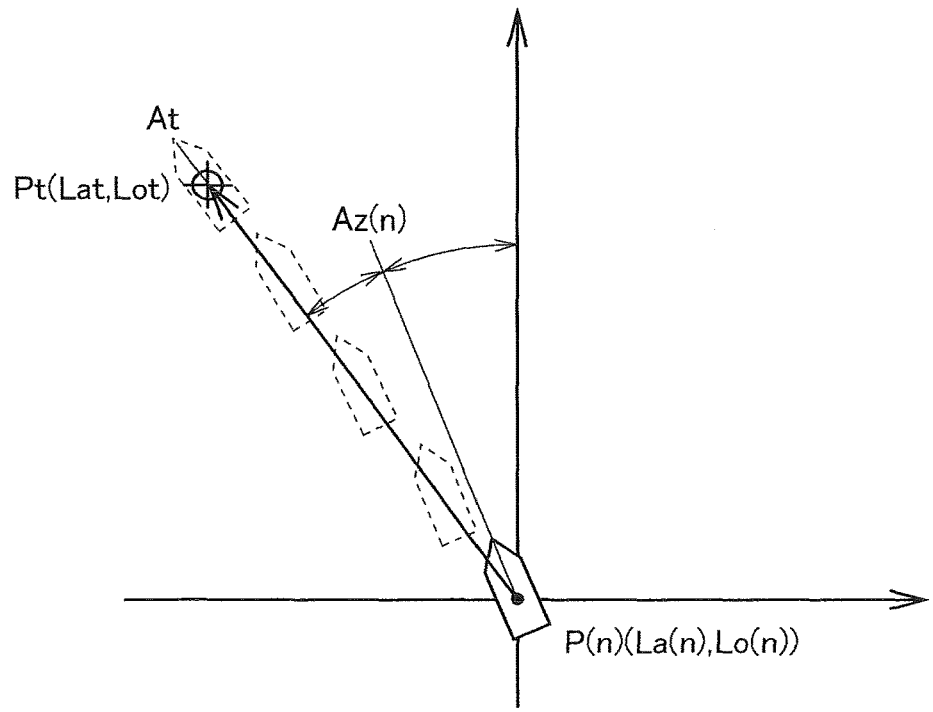
FIG. 4A is a diagram illustrating a relationship between current coordinates and a current orientation and between target coordinates and a target orientation of the ship.

As illustrated in FIG. 4A, the ship handling control device 15 starts the positioning control when the positioning switch 10a of the joystick lever 10 is operated. The ship handling control device 15 acquires current coordinates P(n), including the latitude La(n) and the longitude Lo(n), as the current positional coordinates of the ship 100 calculated by the GPS device 13, and acquires a current orientation Az(n) as the current bow orientation of the ship 100 calculated by the heading sensor 14. The ship handling control device 15 calculates target coordinates Pt, including latitude Lat and longitude Lot, as target positional coordinates of the ship 100, based on the signals, indicating the operation direction and the amount of operation, acquired from the joystick lever 10, and calculates a target orientation At as a bow orientation of the ship 100 at the target coordinates Pt.

Figure 4B:
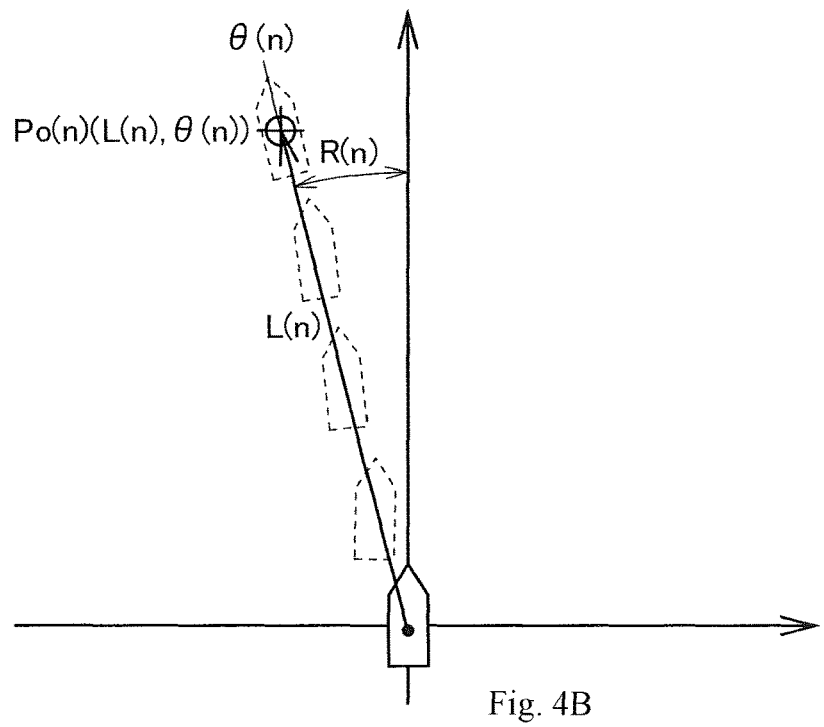
FIG. 4B is a diagram illustrating the target coordinates and the target orientation as polar coordinates, with the current coordinates and the current orientation of the ship as a reference.

As illustrated in FIG. 4B, the ship handling control device 15 calculates a difference between the current coordinates P(n) and the target coordinates Pt, and converts the target coordinates Pt into target polar coordinates Po(n) represented by a distance L(n) and a movement direction $\theta(n)$ from the current coordinates P(n). The ship handling control device 15 further calculates a turning angle R(n) as a difference between the current orientation Az(n) and the target orientation At in an angle.

Figure 5:
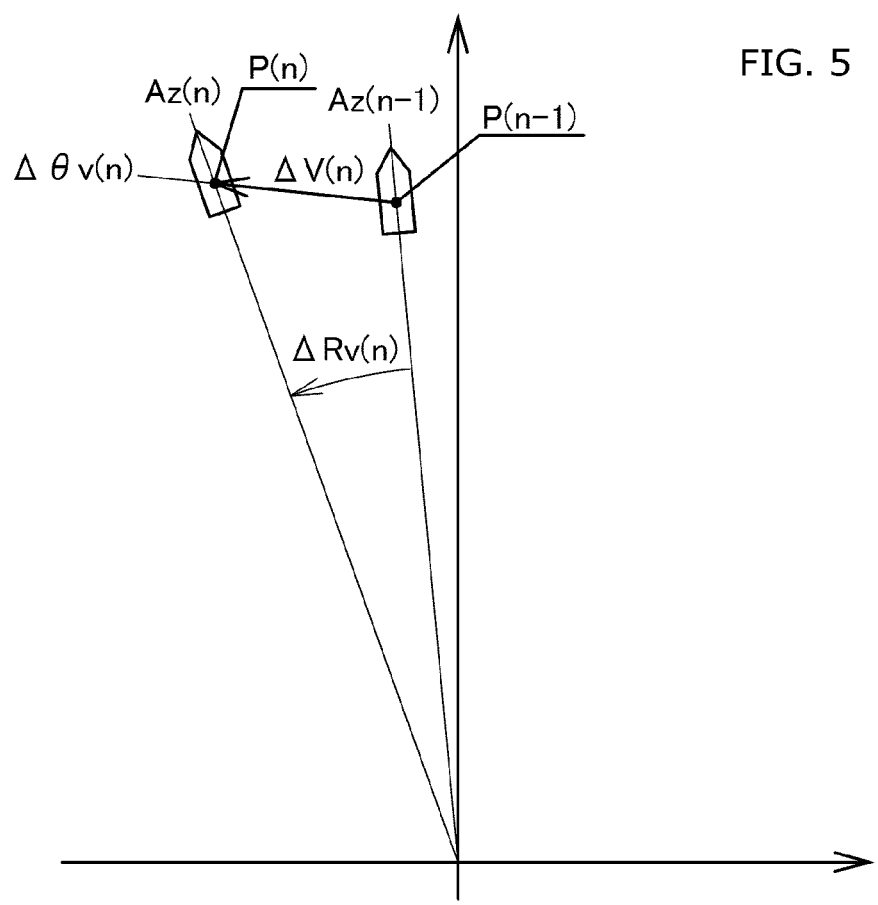
FIG. 5 is a diagram illustrating a movement speed, a movement direction, and a turning speed at a time of movement and turning of the ship.

As illustrated in FIG. 5, the ship handling control device 15 calculates a current turning speed $\Delta Rv(n)$, as a turning speed of the ship 100, based on the difference between the current orientation Az(n) and a current orientation Az(n−1) at a point earlier by a unit time. The ship handling control device 15 calculates a current speed $\Delta V(n)$ and a current direction $\Delta\theta v(n)$, based on the current coordinates P(n) and a current coordinates P(n−1) at a point earlier by the unit time.

With the values calculated as described above, the ship handling control device 15 calculates a target turning amount Rt(n) of the ship 100 in accordance with the current turning speed $\Delta Rv(n)$ of the ship 100 from the turning angle R(n), based on PID control. The ship handling control device 15 calculates a target movement amount Lt(n) of the ship 100, in accordance with the current speed $\Delta V(n)$ of the ship 100 from the distance L(n), based on the PID control. The ship handling control device 15 calculates a target movement direction $\theta t(n)$ of the ship 100 obtained by correcting a deviation due to turning, in accordance with the current direction $\Delta\theta v(n)$ of the ship 100 from the movement direction $\theta(n)$, based on the PID control.

The ship handling control device 15 performs turn control, based on the target turning amount Rt(n) calculated as described above, for controlling the thrust of the forward-rearward travelling propellers 4, the switching state of the switching clutch 3, and the thrust and the rotating direction of the rudder 5 and the side thruster 6, for the ship 100. The ship handling control device 15 performs movement control, based on the target movement amount Lt(n) and the target movement direction $\theta t(n)$ calculated as described above, for controlling the thrust of the forward-rearward travelling propellers 4, the switching state of the switching clutch 3, and the thrust and the rotating direction of the rudder 5 and the side thruster 6, for the ship 100.

Figure 6:
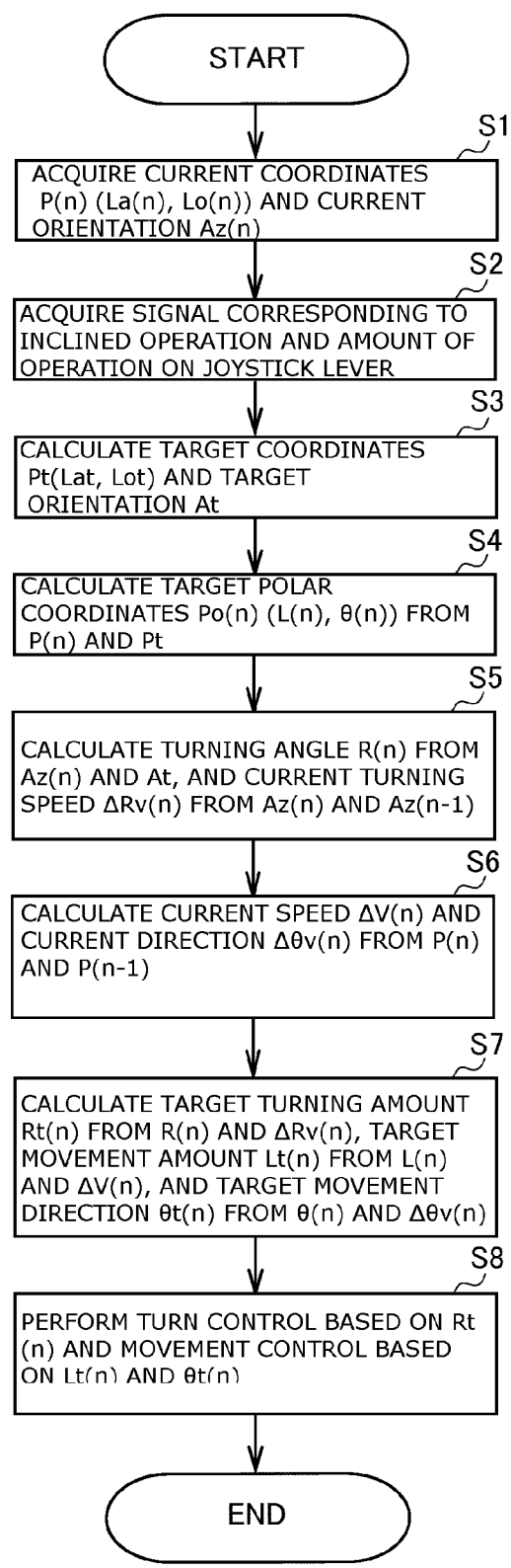
FIG. 6 is a flowchart illustrating a control mode of movement control and turn control for the ship including the ship handling device according to the present invention.

The positioning control (position control) performed by the ship handling control device 15 in the ship 100 as one embodiment of the ship according to the present invention is described in detail below with reference to FIG. 6. In the present embodiment, it is assumed that the ship handling control device 15 has acquired the positioning control start signal in response to the operation on the positioning switch 10a of the joystick lever 10.

In step S1, the ship handling control device 15 acquires the current coordinates P(n), including the latitude La(n) and the longitude Lo(n), as the current positional coordinates of the ship 100 from the GPS device 13, and acquires the current orientation Az(n) as the current bow orientation of the ship 100 from the heading sensor 14. Then, the processing proceeds to step S2.

In step S2, the ship handling control device 15 acquires the signal, corresponding to the inclined direction and the amount of operation on the joystick lever 10, and the processing proceeds to step S3.

In step S3, the ship handling control device 15 calculates the target coordinates Pt, including the latitude Lat and the longitude Lot, as the target positional coordinates of the ship 100 and calculates the target orientation At as the target bow orientation of the ship 100, based on the signal acquired from the joystick lever 10. Then, the processing proceeds to step S4.

In step S4, the ship handling control device 15 calculates the difference between the current coordinates P(n) of the ship 100 and the target coordinates Pt of the ship 100, and converts the target coordinates Pt into the target polar coordinates Po(n), represented by the distance L(n) and the movement direction θ(n) from the current coordinates P(n). Then, the processing proceeds to step S5.

In step S5, the ship handling control device 15 calculates the turning angle R(n), as the difference between the current orientation Az(n) and the target orientation At, and calculates the current turning speed ΔRv(n) from the current orientation Az(n) and the current orientation Az(n−1) at the point earlier by the unit time. Then, the processing proceeds to step S6.

In step S6, the ship handling control device 15 calculates the current speed ΔV(n) and the current direction Δθv(n) from the current coordinates P(n) and the current coordinates P(n−1) at the point earlier by the unit time. Then, the processing proceeds to step S7.

In step S7, based on the PID control, the ship handling control device 15 calculates the target turning amount Rt(n) of the ship 100 per unit time, in accordance with the current turning speed ΔRv(n) of the ship 100 from the turning angle R(n), calculates the target movement amount Lt(n) of the ship 100 per unit time in accordance with the current speed ΔV(n) of the ship 100 from the distance L(n), and calculates the target movement direction θt(n) of the ship 100 per unit time obtained by correcting the deviation due to the turning, in accordance with the current direction Δθv(n) of the ship 100 from the movement direction θ(n). Then, the processing proceeds to step S8.

In step S8, the ship handling control device 15 performs the turn control, based on the target turning amount Rt(n) calculated, for controlling the propulsion device of the ship 100, and performs the movement control, based on the target movement amount Lt(n) and the target movement direction θt(n) calculated, for controlling the propulsion device of the ship 100. Then, the processing proceeds to step S1.

As described above, the ship handling device causes the ship handling control device 15 to convert the target coordinates Pt(0) of the ship 100 into the target polar coordinates Po(n), and thus can calculate the target turning amount Rt(n), the target movement amount Lt(n), and the target movement direction θt(n) independently from each other. Thus, the ship handling device can easily control the thrust of the forward-rearward travelling propellers 4, the switching state of the switching clutch 3, and the thrust and the rotating direction of the rudder 5 and the side thruster 6, for the ship 100.

A dead zone and a mode of dead zone control in the positioning control performed by the ship handling device according to the present invention are described below with reference to FIG. 7 to FIG. 9.

The dead zone in the positioning control is a zone in which the positioning control is not performed under a predetermined condition. The dead zone is set as a predetermined zone around the target coordinates Pt(0) so that the position control can be performed in accordance with a movement of the ship 100 due to inertial force (what is known as way) and an influence of the water flow. The calculation ship handling control device 15 sets the dead zone around the target polar coordinates Po(n) based on the distance L(n) and the turning angle R(n) calculated.

First of all, how the dead zone is set and a mode of the dead zone control in the turn control are described. The turn control includes: controlling the thrust of the forward-rearward travelling propellers 4, the switching state of the switching clutch 3, and the thrust and the rotating direction of the rudder 5 and the side thruster 6; and changing the bow orientation of the ship 100 through rotational movement of the ship 100 about a predetermined point (for example, a center of gravity).

Figure 7:
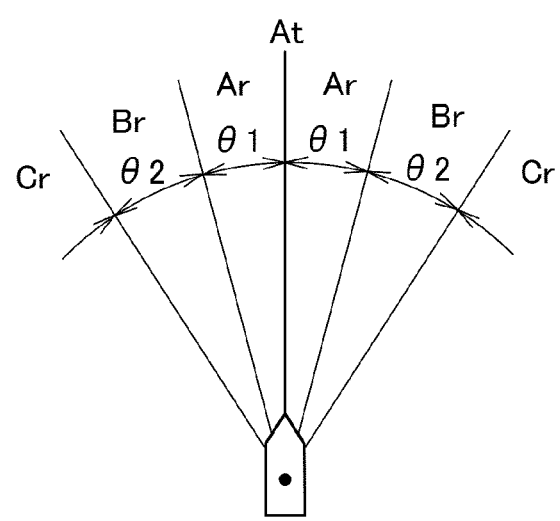
FIG. 7 is a diagram illustrating a configuration of a dead zone in the turn control for the ship including the ship handling device according to the present invention.

As illustrated in FIG. 7, the dead zone includes a plurality of zones with the target orientation At, as the target bow orientation of the ship 100, serving as a reference. The dead zone is set as a predetermined angle range from the rotational center of the ship 100. Specifically, the dead zone is represented by an angle range corresponding to the turning angle R(n) as the difference between the current orientation Az(n) and the target orientation At of the ship 100. The dead zone according to the present embodiment is set as zones within ±180° with + and − respectively corresponding to right and left directions based on the target orientation At. The zones include: a turn control stop zone Ar corresponding to an angle range smaller than |angle θ1|; a buffer zone Br corresponding to an angle range between |angle θ1| inclusive and |angle θ2| exclusive; and a turn control executing zone Cr corresponding to an angle range not smaller than |angle θ2|. Thus, the dead zone is set with the buffer zone Br provided between the turn control stop zone Ar and the turn control executing zone Cr on each of both sides of the target orientation At.

The turn control executing zone Cr corresponds to an angle range in which the turn control of turning the ship 100 is performed with the propulsion devices such as the forward-rearward travelling propeller 4 and the side thruster 6.

Figure 8A:
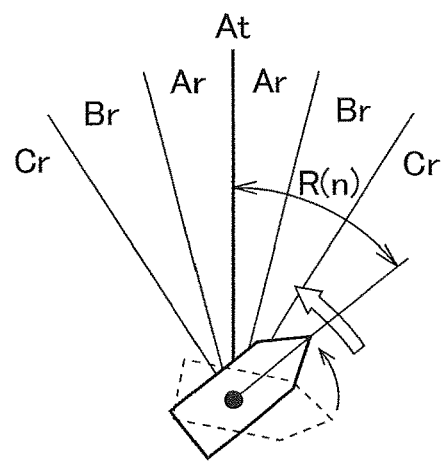
FIG. 8A is a diagram illustrating an operation mode of the ship in a turn control executing zone in the turn control for the ship including the ship handling device according to the present invention.

As illustrated in FIG. 8A, the ship handling control device 15 of the ship handling device performs the turn control based on the PID control in such a manner that the turning angle R(n) of the ship 100 is reduced, when the turning angle R(n) of the ship 100 is within the turn control executing zone Cr (white arrow in FIG. 8A).

The buffer zone Br corresponds to an angle range in which whether the turn control, for turning the ship 100 with the propulsion device such as the forward-rearward travelling propeller 4 and the side thruster 6, is performed or not performed is switched, in accordance with an operation mode at a point when the state where the buffer zone Br includes the turning angle R(n) of the ship 100 is achieved.

Figures 1, 8B:
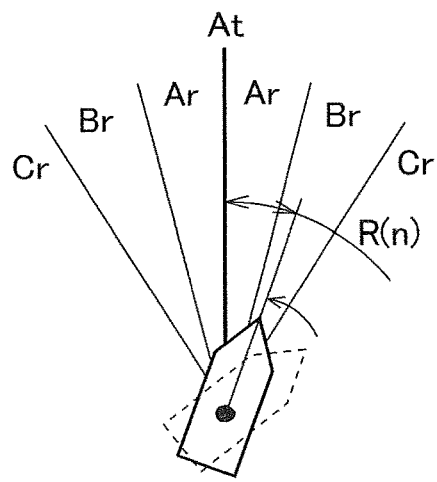
Figures 2, 8B:
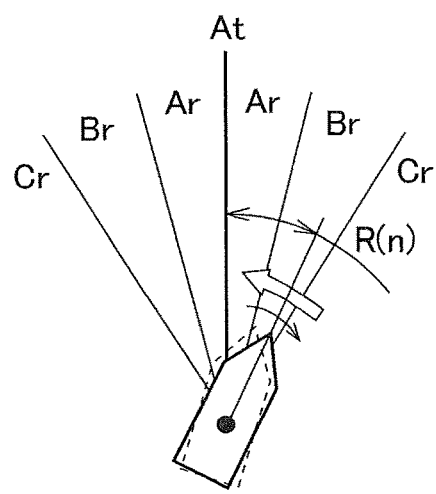

As illustrated in FIG. 8B-1, when the ship 100 turns in such a manner that the turning angle R(n) transitions from the state of being in the turn control executing zone Cr to the state of being in the buffer zone Br (see an arrow in FIG. 8B-1) and is currently in the buffer zone Br with the ship 100 turning in a direction of reducing the turning angle R(n), the ship handling control device 15 of the ship handling device does not perform the turn control regardless of the turning angle R(n).

When the ship 100 is turning in a direction of increasing the turning angle R(n) (see an arrow in FIG. 8B-2), the turn control of reducing the turning angle R(n) is performed (see a white arrow in FIG. 8B-2).

Figure 8C:
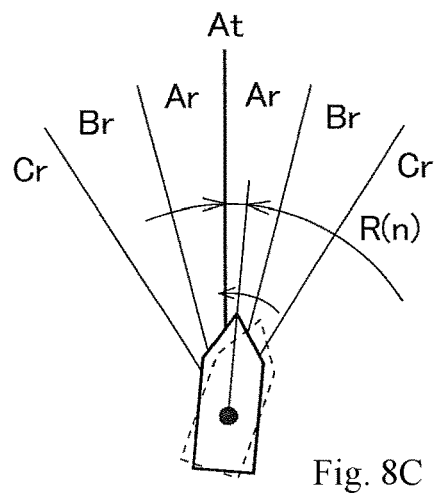
FIG. 8C is a diagram illustrating an operation mode of the ship in a turn control stop zone.

As illustrated in FIG. 8C, when the ship 100 is turning with the turning angle R(n) moving from one of the buffer zone Br and the turn control stop zone Ar to the other, the ship handling control device 15 of the ship handling device does not perform the turn control regardless of the turning direction or the turning angle R(n).

The turn control stop zone Ar corresponds to a distance range in which the movement control, for moving the ship 100 with the propulsion device such as the forward-rearward travelling propeller 4 and the side thruster 6, is not performed.

As illustrated in FIG. 8C, when the ship 100 is turned so that the turning angle R(n) is included in the turn control stop zone Ar, the ship handling control device 15 of the ship handling device 7 does not perform the turn control regardless of the turning angle R(n) of the ship 100.

Specifically, the turn control of the ship 100 stops when the bow is in the area defined by the turn control stop zone Ar or the area defined by the buffer zone Br due to the turning in the direction toward the target orientation At, and when the bow is in the area defined by the turn control stop zone Ar or enters the area defined by the buffer zone Br from the area defined by the turn control stop zone Ar due to the turning in the direction away from the target orientation At.

Next, the mode of the dead zone control in the turn control performed by the ship handling device 7 according to the present invention is described in detail. In the present embodiment, it is assumed that the ship handling control device 15 has calculated the target orientation At as the target bow orientation of the ship 100, based on the signal indicating the operation direction and the amount of operation acquired from the joystick lever 10.

Figure 9:
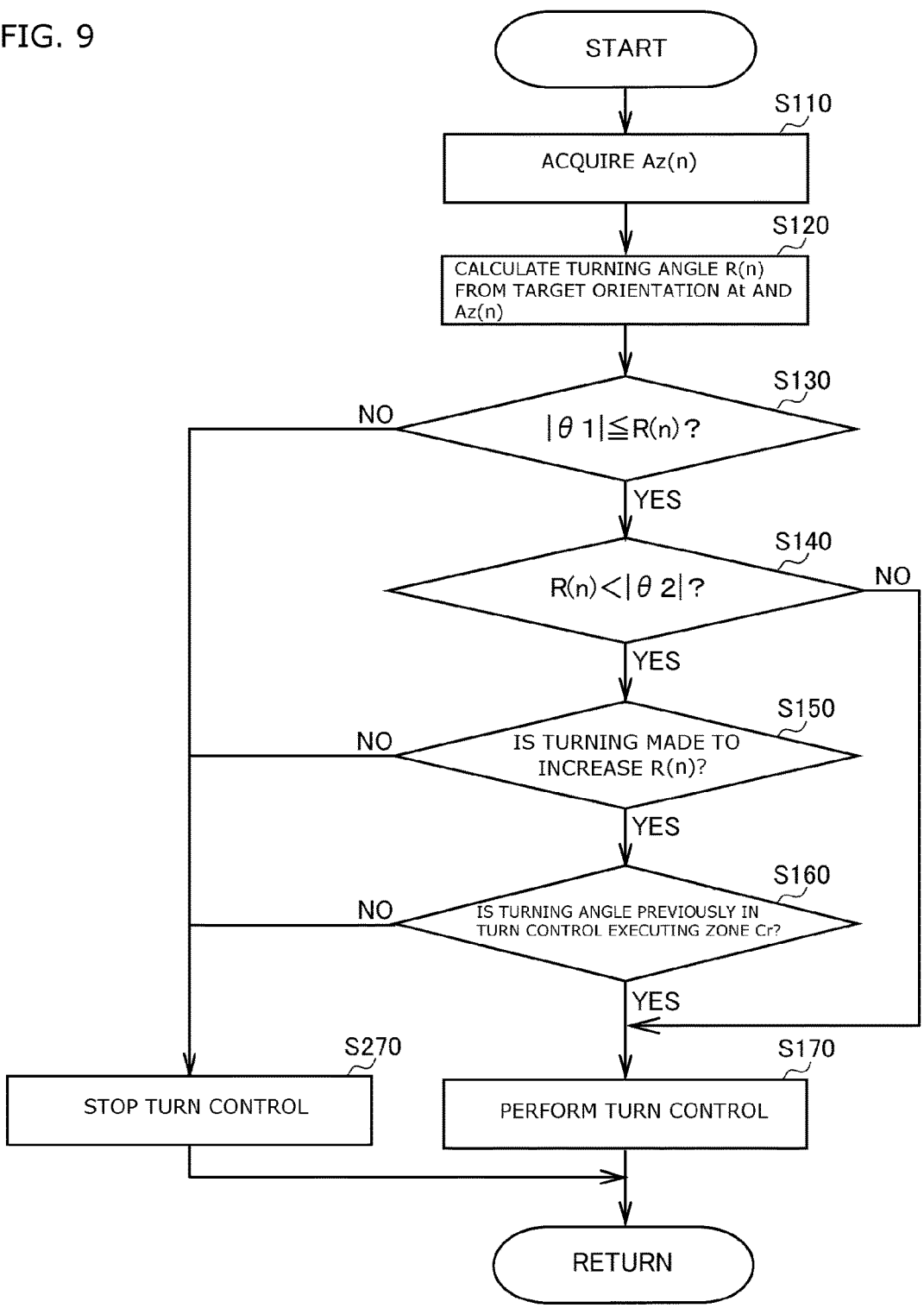
FIG. 9 is a flowchart illustrating a control mode of dead zone control in the turn control for the ship including the ship handling device according to the present invention.

As illustrated in FIG. 9, in step S110, the ship handling control device 15 acquires the current orientation Az(n) of the bow of the ship 100 from the heading sensor 14. Then, the processing proceeds to step S120.

In step S120, the ship handling control device 15 calculates the turning angle R(n) from the target orientation At calculated in advance, and the current orientation Az(n) that has been acquired. Then, the processing proceeds to step S130.

In step S130, the ship handling control device 15 determines whether the turning angle R(n) calculated is equal to or larger than the |angle θ1|.

As a result, when the ship handling control device 15 determines that the turning angle R(n) calculated is equal to or larger than the |angle θ1|, that is, that the current orientation Az(n) is not within the turn control stop zone Ar, the processing proceeds to step S140.

When the ship handling control device 15 determines that the turning angle R(n) calculated is smaller than the |angle θ1|, that is, that the current orientation Az(n) is within the turn control stop zone Ar, the processing proceeds to step S270.

In step S140, the ship handling control device 15 determines whether the turning angle R(n) calculated is smaller than the |angle θ2|.

As a result, when the ship handling control device 15 determines that the turning angle R(n) calculated is smaller than the |angle θ2|, that is, that the current orientation Az(n) is within the buffer zone Br, the processing proceeds to step S150.

When the ship handling control device 15 determines that the turning angle R(n) calculated is not smaller than the |angle θ2|, that is, that the current orientation Az(n) is not within the buffer zone Br, the processing proceeds to step S170.

In step S150, the ship handling control device 15 determines whether the turning angle R(n) calculated is larger than the turning angle R(n−1) calculated at the point earlier by the unit time. Specifically, the ship handling control device 15 determines whether the ship 100 is turning in the direction away from the target orientation At.

As a result, when it is determined that the turning angle R(n) calculated is larger than the turning angle R(n−1) calculated at the point earlier by the unit time, that is, that the ship 100 is turning in the direction away from the target orientation At, the processing proceeds to step S160.

When it is determined that the turning angle R(n) calculated is not larger than the turning angle R(n−1) calculated at the point earlier by the unit time, that is, that the ship 100 is not turning in the direction away from the target orientation At, the processing proceeds to step S270.

In step S160, the ship handling control device 15 determines whether the turning angle R(n) calculated has previously been in the turn control executing zone Cr.

As a result, when it is determined that the turning angle R(n) calculated has previously been in the turn control executing zone Cr, the processing proceeds to step S170.

When it is determined that the turning angle R(n) calculated has not previously been in the turn control executing zone Cr, the processing proceeds to step S270.

In step S170, the ship handling control device 15 performs the turn control, and the processing proceeds to step S110.

In step S270, the ship handling control device 15 stops the turn control, and the processing proceeds to step S110.

Figure 10:
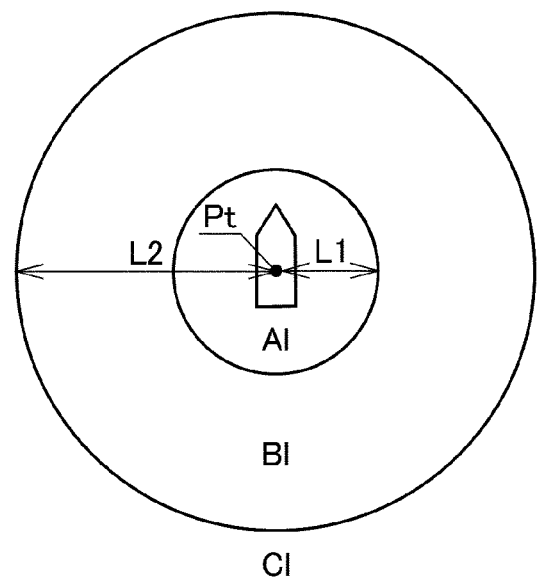
FIG. 10 is a diagram illustrating a configuration of a dead zone in the movement control for the ship including the ship handling device according to the present invention.
Figure 11A:
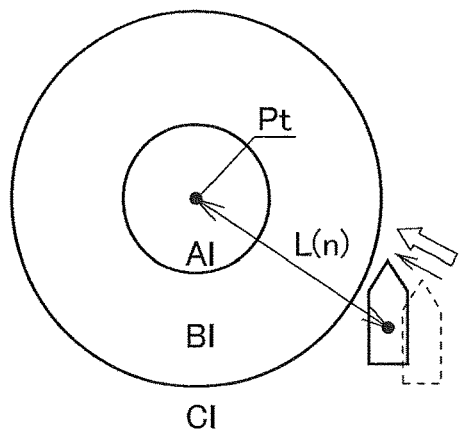
FIG. 11A is a diagram illustrating an operation mode of the ship in a movement control executing zone in the movement control for the ship including the ship handling device according to the present invention.
Figures 1, 11B:
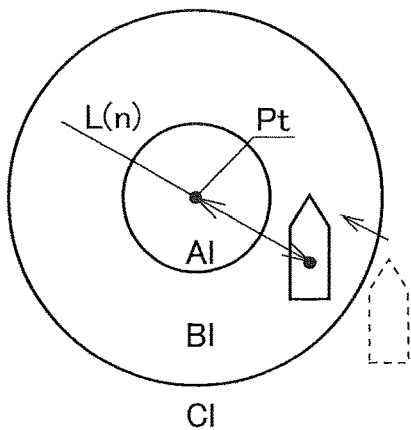
Figures 2, 11B:
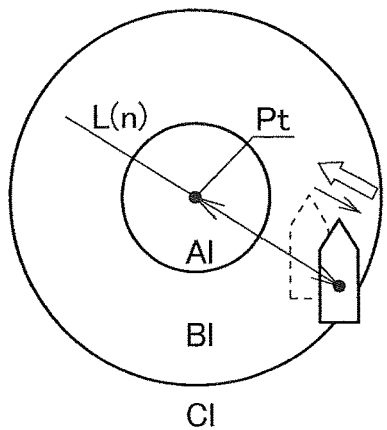

Next, how the dead zone is set and a mode of the dead zone control in the movement control are described with reference to FIG. 10 and FIGS. 11A-11B are described. In the movement control, the ship 100 is moved to the target coordinates Pt by controlling the thrust of the forward-rearward travelling propellers 4, the switching state of the switching clutch 3, and the thrust and the rotating direction of the rudder 5 and the side thruster 6.

As illustrated in FIG. 10, the dead zone includes a plurality of zones around the target coordinates Pt as the target position of the ship 100. The dead zone is set within the predetermined distance range from the target coordinates Pt of the ship 100. The dead zone is represented by a distance range corresponding to the distance L(n) between the current coordinates P(n) and the target coordinates Pt. The dead zone according to the present embodiment includes zones within the distance range. The zones include: the movement control stop zone A1 corresponding to a distance range with a distance smaller than the distance L1 from the target coordinates Pt; the buffer zone B1 corresponding to a distance range between the distance L1 inclusive and the distance L2 exclusive from the target coordinates Pt; and the movement control executing zone C1 corresponding to a distance range that is equal to or larger than the distance L2 from the target coordinates Pt, that is, the zone excluding the movement control stop zone A1 and the buffer zone B1. Thus, the dead zone is set around the target coordinates Pt with the buffer zone B1 provided between the movement control stop zone A1 and the movement control executing zone C1.

The movement control executing zone C1 is a distance range in which the movement control is performed for moving the ship 100 with the propulsion device such as the forward-rearward travelling propellers 4 and the side thruster 6.

As illustrated in FIG. 11A, when the distance L(n) from the ship 100 is in the movement control executing zone C1, the ship handling control device 15 of the ship handling device performs the movement control based on the PID control to reduce the distance L(n) from the ship 100 (white arrow in FIG. 11A).

The buffer zone B1 is a distance range in which whether the movement control is performed for moving the ship 100 with the propulsion device such as the forward-rearward travelling propeller 4 and the side thruster 6 is switched, in accordance with an operation mode at the point when a state where the distance L(n) from the ship 100 is in the buffer zone B1 is achieved.

As illustrated in FIG. 11B-1, when the ship 100 has moved in such a manner that the distance L(n) transitions from a state of being in the movement control stop zone A1 to a state of being in the buffer zone B1 (see an arrow in FIG. 11B-1) and is currently in the buffer zone B1, that is, when the ship 100 is turning in the direction to reduce the distance L(n), the ship handling control device 15 of the ship handling device does not perform the movement control regardless of the distance L(n).

When the ship 100 is moving in the direction of increasing the distance L(n) (see an arrow in FIG. 11B-2), the movement control of reducing the distance L(n) is performed (see a white arrow in FIG. 11B-2).

Figure 11C:
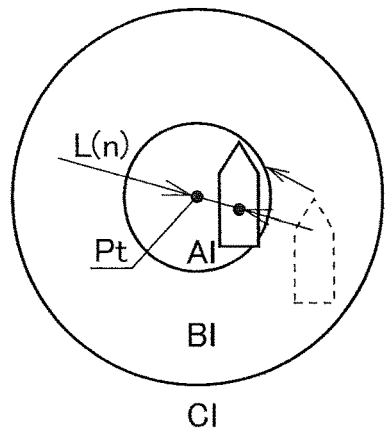
FIG. 11C is a diagram illustrating an operation mode of the ship in the movement control stop zone.

As illustrated in FIG. 11C, when the distance L(n) is changing in such a manner that the ship 100 is moving between the buffer zone B1 and the movement control stop zone A1, the ship handling control device 15 of the ship handling device does not perform the movement control regardless of the movement direction or the distance L(n).

The movement control stop zone A1 is a distance range in which the movement control of moving the ship 100 with the propulsion device such as the forward-rearward travelling propeller 4 and the side thruster 6 is not performed. The ship handling control device 15 of the ship handling device does not perform the turn control regardless of the turning angle R(n) of the ship 100, when the distance L(n) from the ship 100 is within the movement control stop zone A1.

Thus, the movement control is stopped when the ship 100 is in the area defined by the movement control stop zone A1 or in the area defined by the buffer zone B1 as a result of moving in the direction of approaching the target coordinates Pt and also when the ship 100 is in the area defined by the movement control stop zone A1 or enters the area defined by the buffer zone B1 from area defined by the movement control stop zone A1 while moving in the direction away from the target coordinates Pt.

Next, the mode of the dead zone control in the movement control performed by the ship handling device 7 according to the present invention is described in detail. In the present embodiment, it is assumed that the ship handling control device 15 has calculated the target coordinates Pt, including the latitude Lat and the longitude Lot, as the target positional coordinates of the ship 100, based on the signal indicating the operation direction and the amount of operation acquired from the joystick lever 10.

Figure 12:
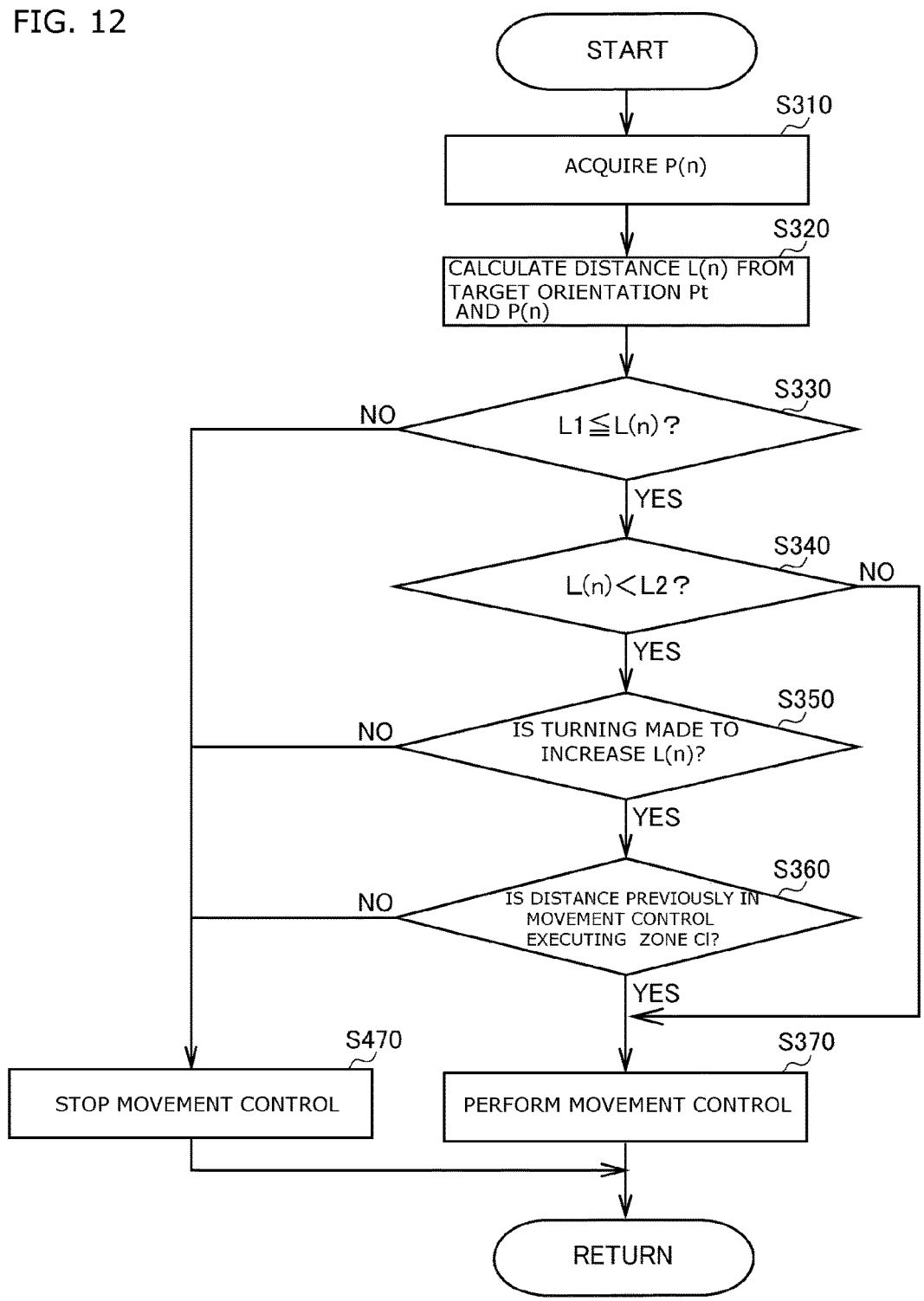
FIG. 12 is a flowchart illustrating a control mode of dead zone control in the movement control for the ship including the ship handling device according to the present invention.

As illustrated in FIG. 12, in step S310, the ship handling control device 15 acquires the current coordinates P(n) of the ship 100 from the GPS device 13. Then, the processing proceeds to step S320.

In step S320, the ship handling control device 15 calculates the distance L(n) from the target coordinates Pt calculated in advance and the current coordinates P(n) acquired. Then, the processing proceeds to step S330.

In step S330, the ship handling control device 15 determines whether the distance L(n) calculated is equal to or larger than the distance L1.

As a result, when the ship handling control device 15 determines that the distance L(n) calculated is equal to or larger than the distance L1, that is, that the current coordinates P(n) are not in the movement control stop zone A1, the processing proceeds to step S340.

When the ship handling control device 15 determines that the distance L(n) calculated is smaller than the distance L1, that is, that the current coordinates P(n) are in the movement control stop zone A1, the processing proceeds to step S470.

In step S340, the ship handling control device 15 determines whether the distance L(n) calculated is smaller than the distance L2.

As a result, when the ship handling control device 15 determines that the distance L(n) calculated is smaller than the distance L2, that is, that the current coordinates P(n) are in the buffer zone Br, the processing proceeds to step S350.

When the ship handling control device 15 determines that the distance L(n) calculated is not smaller than the distance L2, that is, that the current coordinates P(n) are not in the buffer zone Br, the processing proceeds to step S370.

In step S350, the ship handling control device 15 determines whether the distance L(n) calculated is larger than the distance L(n−1) calculated at the point earlier by the unit time. Thus, the ship handling control device 15 determines whether the ship 100 is moving in a direction away from the target coordinates Pt.

As a result, when it is determined that the distance L(n) calculated is larger than the distance L(n−1) calculated at the point earlier by the unit time, that is, that the ship 100 is moving in the direction away from the target coordinates Pt, the processing proceeds to step S360.

When it is determined that the distance L(n) calculated is not larger than the distance L(n−1) calculated at the point earlier by the unit time, that is, that the ship 100 is not moving in the direction away from the target coordinates Pt, the processing proceeds to step S470.

In step S360, the ship handling control device 15 determines whether the distance L(n) calculated has previously been in the movement control executing zone C1.

As a result, when it is determined that the distance L(n) calculated has previously been in the movement control executing zone C1, the processing proceeds to step S370.

When it is determined that the distance L(n) calculated has not previously been in the movement control executing zone C1, the processing proceeds to step S470.

In step S370, the ship handling control device 15 performs the movement control, and the processing proceeds to step S310.

In step S470 the ship handling control device 15 stops the movement control, and the processing proceeds to step S310.

In this configuration with the zone thus set, the control mode can be changed in accordance with the way of the ship 100 and whether there is an influence due to a disturbance such as a water flow or wind. Thus, the positioning control is performed in accordance with the inertial force of the ship and the influence of the disturbance. Thus, the ship 100 can reach a portion around the target orientation At and the target coordinates Pt, without being stopped at the boundary of the dead zone due the influence of the water flow and the wind. In the present embodiment, the angle range of the buffer zone Br, the distance range of the buffer zone B1, the thrust in the turn control, and the thrust in the movement control may be changed in accordance with the shape of the ship body and the behavior of the ship 100. For example, when data from the GPS device 13 and the heading sensor 14 indicates that the ship is likely to stop at a portion near the turn control stop zone Ar or the movement control stop zone A1, a small buffer zone may be set.

A mode of turn correction control for a deviation of the movement direction due to the turning in the positioning control performed by the ship handling device according to the present invention is described below with reference to FIGS. 13A-13B and FIGS. 14A-14B.

The deviation of the movement direction due to the turning in the positioning control is a deviation of the movement direction θ(n) in the movement control for the ship 100 due to the turn control, in a case where the movement control for the ship 100 and the turn control for the ship 100 are concurrently performed.

First of all, a control mode with no turn correction control employed for a deviation of the movement direction due to the turning is described with reference to FIGS. 13A and 13B. In the present embodiment, the ship 100 has been moved from the current coordinates P(n) to the target coordinates Pt in the movement direction θ(n) by the movement control, and has had the bow turned by 180° to the target orientation At from the current orientation Az(n) by the turn control.

Figure 13A:
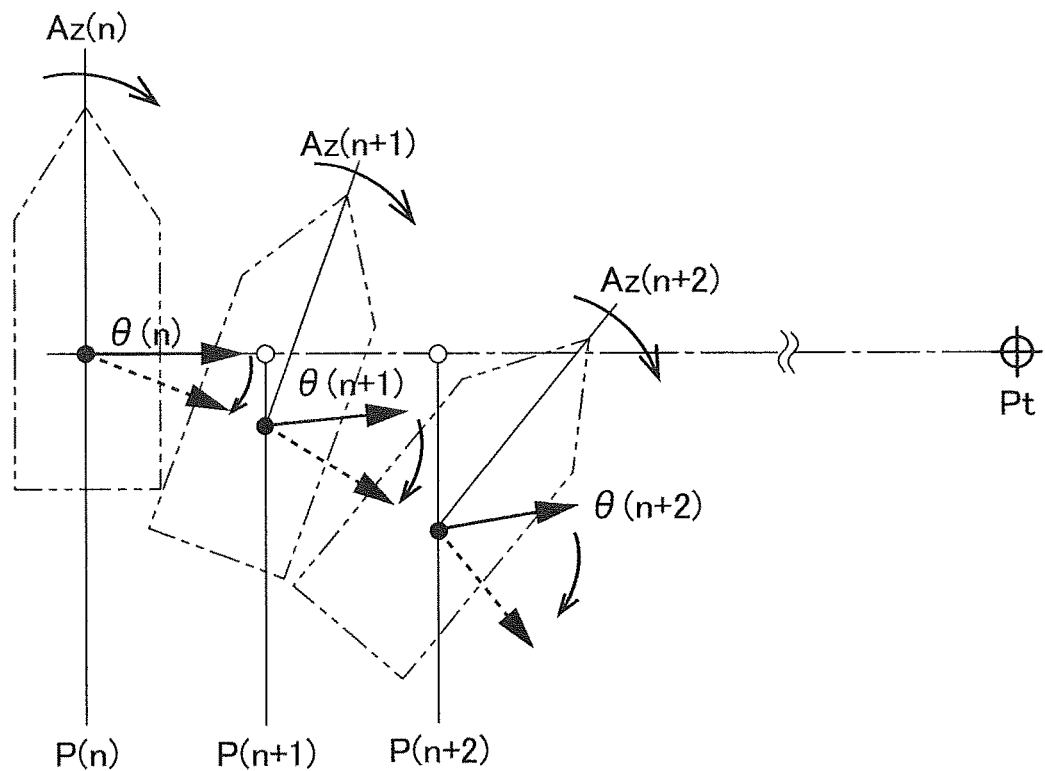
FIG. 13A is a diagram illustrating an operation mode of the ship when the movement control and the turn control are performed for the ship including the ship handling device according to the present invention.

As illustrated in FIG. 13A, upon acquiring the current coordinates P(n), the ship handling control device 15 performs the movement control so that the ship 100 moves from the current coordinates P(n) to a current coordinates P(n+1) in the movement direction θ(n), and performs the turn control so that the turning from the current orientation Az(n) to a current orientation Az(n+1) is achieved. In this process, the ship 100 is affected by the turn control in such a manner that the movement direction θ(n) at the current coordinates P(n) (see a black arrow in FIG. 13A) is deviated from the direction toward the target coordinates Pt (see a black dashed line in FIG. 13A). Thus, the ship 100 is moved by the movement control in a direction deviated from a direction linearly connecting the current coordinates P(n) to the target coordinates Pt.

Upon acquiring the current coordinates P(n+1), the ship handling control device 15 performs the movement control so that the ship 100 moves from the current coordinates P(n+1) to current coordinates P(n+2) in a movement direction θ(n+1) obtained by correcting the deviation, and performs turn control so that turning from the current orientation Az(n+1) to a current orientation Az(n+2) is achieved. In this process, the ship 100 is affected by the turn control in such a manner that the movement direction θ(n+1) at the current coordinates P(n+1) (see a black arrow in FIG. 13A) is deviated from the direction toward the target coordinates Pt (see the black dashed line in FIG. 13A).

Figure 13B:
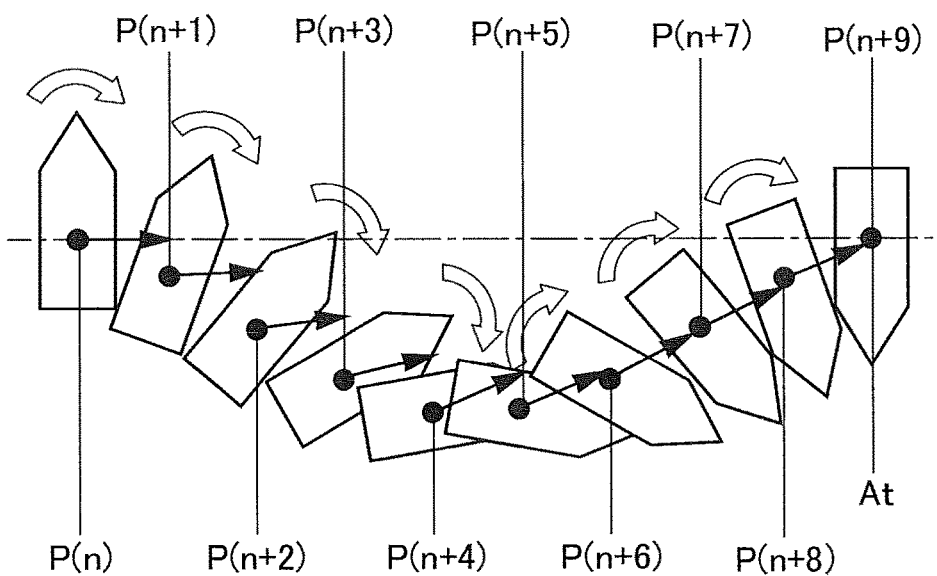
FIG. 13B is a diagram illustrating a route of the ship from the current coordinates to the target coordinates.

As a result, as illustrated in FIG. 13B, the ship handling control device 15 cannot perform the control in such a manner that the ship 100 moves along a linear route between the current coordinates P(n) and the target coordinates Pt due to the deviation to the turned direction attributable to the deviation of the movement direction θ(n) caused by the influence of the turn control.

Next, a control mode in a case with the turn correction control employed for the deviation of the movement direction due to turning is described with reference to FIGS. 14A and 14B.

Figure 14A:
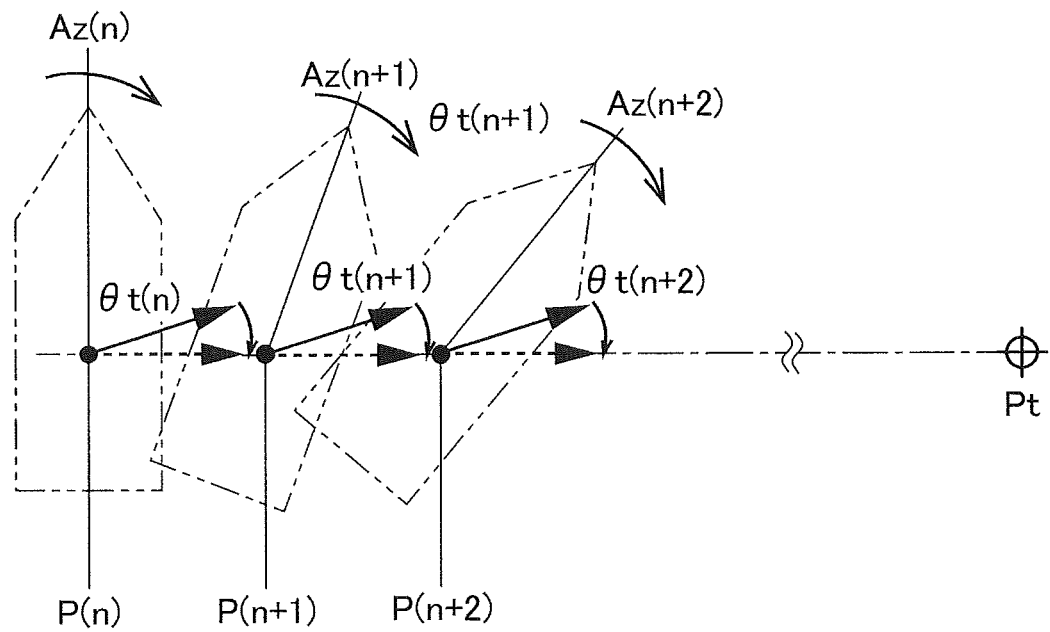
FIG. 14A is a diagram illustrating an operation mode of the ship the at a time when the movement control and the turn control are performed with turn correction control employed for the ship including the ship handling device according to the present invention.

As illustrated in FIG. 14A, upon acquiring the current coordinates P(n), the ship handling control device 15 performs the movement control so that the ship 100 moves from the current coordinates P(n) to the current coordinates P(n+1) in the movement direction θ(n), and performs the turn control so that the turning from the current orientation Az(n) to the current orientation Az(n+1) is achieved. Here, the turn control would affect the ship 100 in such a manner that the movement direction θ(n) at the current coordinates P(n) is deviated from the direction to the target coordinates Pt (see the black dashed line in FIG. 13A). Thus, the ship handling control device 15 performs the turn correction control, based on the current orientation Az(n+1) of the ship 100 that has moved to the current orientation Az(n+1), so that the ship 100 moves in the target movement direction θt(n).

Figure 14B:
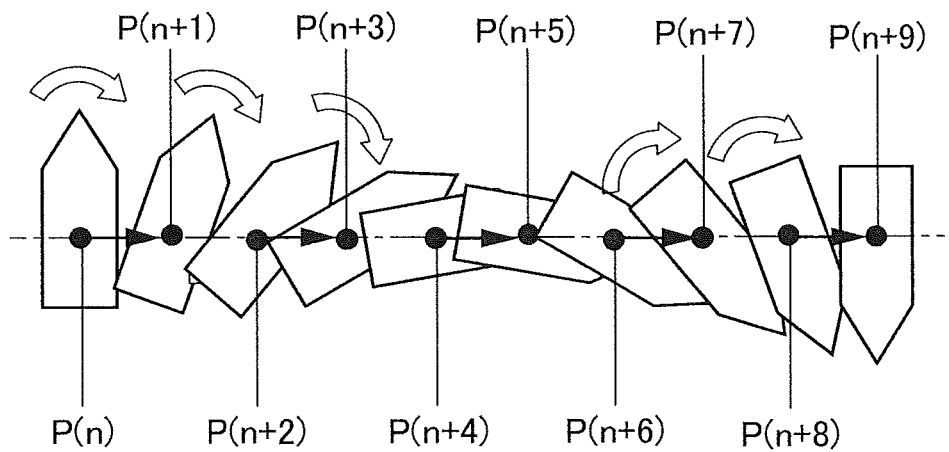
FIG. 14B is a diagram illustrating a route of the ship from the current coordinates to the target coordinates with the turn correction control employed.

As a result, as illustrated in FIG. 14B, the ship handling control device 15 corrects the deviation of the movement direction θ(n) due to the influence of the turn control, and thus can perform the control for making the ship 100 move along the substantially linear route between the current coordinates P(n) and the target coordinates Pt.

In this configuration with the turn correction control employed for correcting the movement direction θ(n) in the movement control to the target movement direction θt(n) based on the influence of the turn control, the ship 100 moves along the substantially linear route from the current coordinates P(n) to the target coordinates Pt. Thus, an area required for the movement and turning can be made small even when the movement control and the turn control are concurrently performed.

How the target coordinates Pt and the target orientation At are set by using the joystick lever 10 in the positioning control, in the ship handling device according to the present invention are described below with reference to FIGS. 15A-15C and FIG. 16.

Figure 15A:
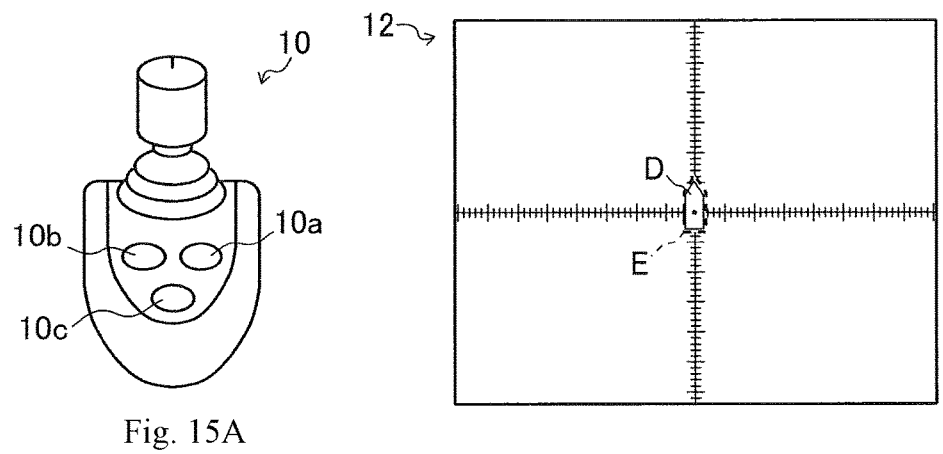
FIG. 15A is a diagram illustrating a mode of a joystick lever 10 and a monitor at a time when the positioning control starts for the ship including the ship handling device according to the present invention.
Figure 15B:
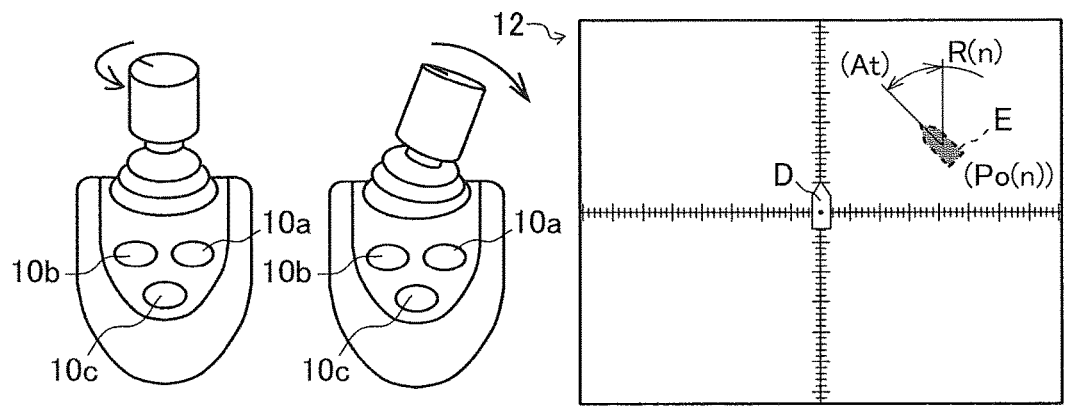
FIG. 15B is a diagram illustrating a mode of the joystick lever and the monitor at a time when the target coordinates and the target orientation are set.
Figure 15C:
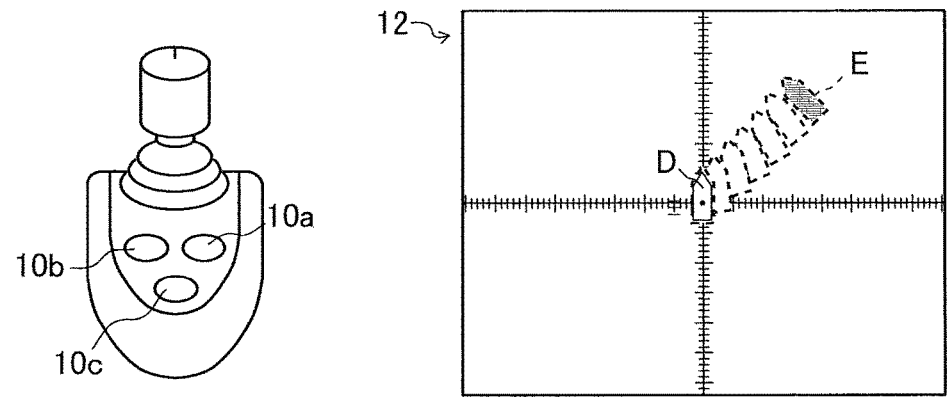
FIG. 15C is a diagram illustrating a mode of the joystick lever and the monitor at a time of the turn control and the movement control.

As illustrated in FIGS. 15A-15C, the ship handling device is configured to perform the positioning control with the ship handling control device 15 in such a manner that the target coordinates Pt and the target orientation At are set with the joystick lever 10 and graphics D and E representing the ship 100 displayed on the monitor 12. The ship handling control device 15 displays the graphic D at a center portion of the monitor 12 of the ship handling device with the bow direction matching with that of the ship 100, and displays the graphic E representing the target coordinates Pt and the target orientation At of the ship 100.

As illustrated in FIG. 15A, upon acquiring a signal from the positioning switch 10a of the joystick lever 10, the ship handling control device 15 starts the positioning control. Specifically, upon acquiring the signal from the positioning switch 10a, the ship handling control device 15 respectively sets the position and the orientation of the graphic D as the current coordinates P(n) and the current orientation Az(n) of the ship 100. At the same time, the ship handling control device 15 displays the graphic E (a ship shaped graphic illustrated with a dashed line in the present embodiment), which can be distinguished from the graphic D, at the same position as the graphic D.

As illustrated in FIG. 15B, the ship handling control device 15 calculates the target coordinates Pt and the target orientation At, based on a signal acquired from the joystick lever 10. Specifically, the ship handling control device 15 calculates the target orientation At based on the rotation amount of the joystick lever 10 and calculates the target coordinates Pt from the inclined direction and the inclined amount of the joystick lever 10. Furthermore, the ship handling control device 15 calculates the target coordinates Pt as the target polar coordinates Po(n) represented by the distance L(n) from the current coordinates P(n) and the movement direction θ(n), and calculates the target orientation At as the turning angle R(n) representing the difference between the current orientation Az(n) and the current orientation Az(n). The ship handling control device 15 displays the graphic E on the target coordinates Pt, on the basis of the target polar coordinates Po(n) and the turning angle R based on the current orientation Az(n).

Upon acquiring a movement signal from the movement switch 10b of the joystick lever 10, the ship handling control device 15 controls the thrust of the forward-rearward travelling propellers 4, the switching state of the switching clutch 3, and the thrust and the rotating direction of the rudder 5 and the side thruster 6, so that the ship 100 moves toward the target coordinates Pt and turns toward the target orientation At. In this process, the ship handling control device 15 moves the ship 100 with the turn correction control for the deviation of the movement direction due to the turning employed as described above. The ship handling control device 15 performs the movement control and the turn control with the dead zone control employed as described above so that the ship 100 is included in the predetermined range from the target coordinates Pt and the target orientation At. Furthermore, the ship handling control device 15 performs the control in such a manner that the ship 100 with the dead zone control employed is kept within the predetermined range of the target coordinates Pt and the target orientation At.

As illustrated in FIG. 15C, when the ship 100 starts to move, the ship handling control device 15 moves the graphic E on the basis of the distance L(n) to the target coordinates Pt and the movement direction θ(n), based on the current coordinates P(n). Similarly, the ship handling control device 15 turns the graphic E on the basis of the turning angle R(n) to the target orientation At, based on the current orientation Az(n). Specifically, the ship handling control device 15 displays the graphic E that is interlocked with the moving and the turning of the ship 100, based on the graphic D. Thus, the graphic E is displayed closer the graphic D, as the ship 100 approaches the target coordinates Pt and the target orientation At. In the present embodiment, the graphic E representing the target coordinates Pt and the target orientation At is displayed. Alternatively, the distance L(n) and the turning angle R(n) may be displayed on the monitor 12.

Next, a mode of positioning control using the joystick lever 10 in the ship handling device 7 according to the present invention is described in detail. In the present embodiment, the ship handling control device 15 acquires the current coordinates P(n) from the GPS device 13 as appropriate, and acquires the current orientation Az(n) of the bow of the ship 100 from the heading sensor 14 as appropriate.

Figure 16:
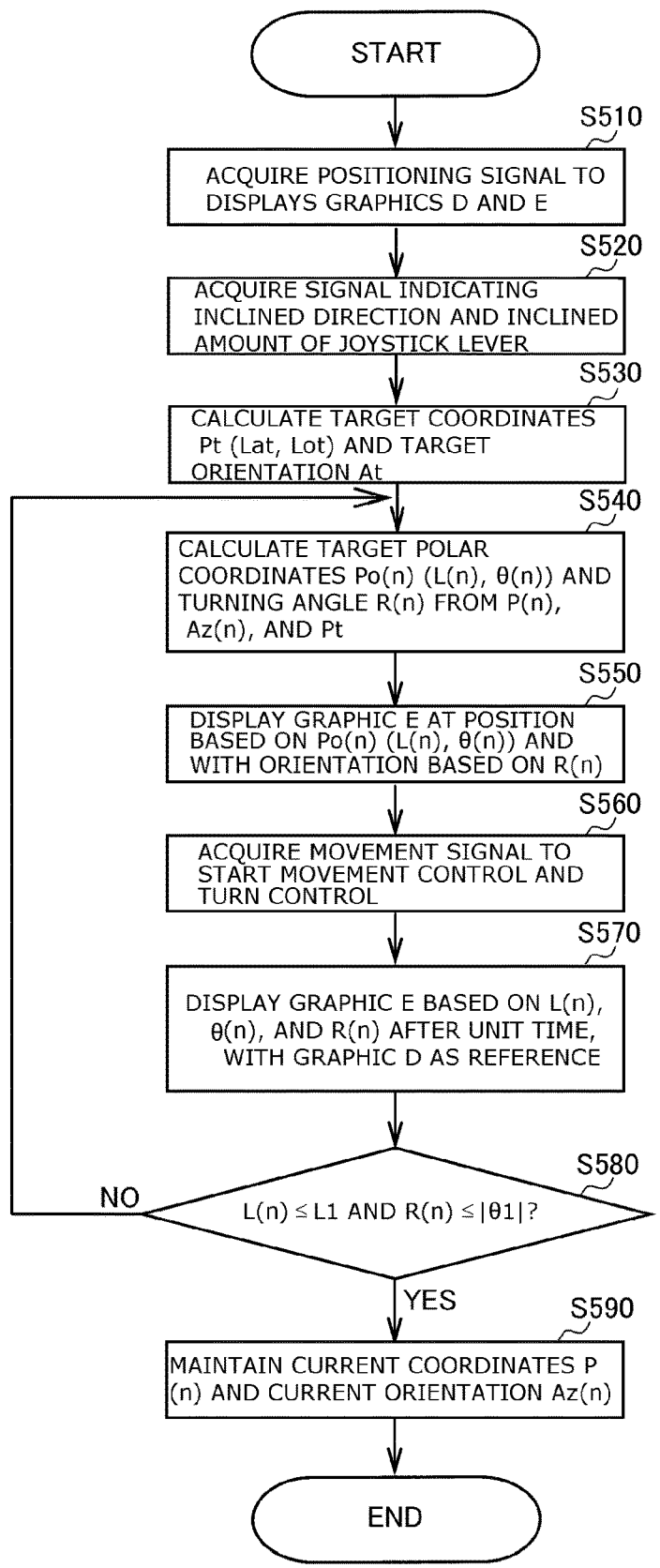
FIG. 16 is a flowchart illustrating a control mode in positioning control for the ship including the ship handling device according to the present invention.

As illustrated in FIG. 16, in step S510, the ship handling control device 15 acquires the positioning signal from the positioning switch 10a of the joystick lever 10 and displays the graphic D, representing the current coordinates P(n) and the current orientation Az(n) of the ship 100, at the center of the monitor 12, and displays the graphic E, which can be distinguished from the graphic D, in such a manner as to be overlapped with the graphic D. Then, the processing proceeds to step S520.

In step S520, the ship handling control device 15 acquires a signal indicating the inclined direction and the inclined amount from the joystick lever 10. Then, the processing proceeds to step S530.

In step S530, the ship handling control device 15 calculates the target coordinates Pt and the target orientation At of the ship 100. Then, the processing proceeds to step S540.

In step S540, the ship handling control device 15 calculates the distance L(n) to the target coordinates Pt and the movement direction θ(n) based on the current coordinates P(n), and calculates the turning angle R(n) representing an angle to the target orientation At based on the current orientation Az(n). Then, the processing proceeds to step S550.

In step S550, the ship handling control device 15 displays the graphic E at a position based on the distance L(n), the movement direction θ(n), and the turning angle R(n) calculated. Then, the processing proceeds to step S560.

In step S560, the ship handling control device 15 acquires the movement signal from the movement switch 10b of the joystick lever 10, and starts the turn control and the movement control for the ship 100 based on the dead zone control and the turn correction control. Then, the processing proceeds to step S570.

In step S570, the ship handling control device 15 moves the graphic E on the basis of the distance L(n), the movement direction θ(n), and the turning angle R(n) after the unit time, with the graphic D displayed on the monitor 12 as the reference. Then, the processing proceeds to step S580.

In step S580, the ship handling control device 15 determines whether the distance L(n) from the ship 100 is shorter than the distance L1 within a predetermined range from the target coordinates Pt based on the dead zone control and whether the turning angle R(n) of the ship 100 is smaller than the |angle θ1| within a predetermined range of the target orientation At based on the dead zone control.

As a result, when it is determined that the distance L(n) from the ship 100 is shorter than the distance L1 within the predetermined range from the target coordinates Pt based on the dead zone control and that the turning angle R(n) of the ship 100 is smaller than the |angle θ1| within the predetermined range of the target orientation At based on the dead zone control, the processing proceeds to step S590.

When it is determined that the distance L(n) from the ship 100 is not shorter than the distance L1 within the predetermined range from the target coordinates Pt based on the dead zone control or that the turning angle R(n) of the ship 100 is not smaller than the |angle θ1| within the predetermined range of the target orientation At based on the dead zone control, the processing proceeds to step S540.

In step S590, the ship handling control device 15 maintains the current coordinates P(n) and the current orientation Az(n), and the processing is terminated.

With the configuration described above, the target coordinates Pt and the target orientation At of the ship 100 are intuitively set with an operation on the joystick lever 10, based on the current coordinates P(n) and the current orientation Az(n) of the ship 100. Thus, an operator accurately recognizes the positional relationship between the current position and the target position of the ship 100, whereby positioning control can be easily performed for the ship 100.

INDUSTRIAL APPLICABILITY

The present invention can be applied to a technique for a ship handling device.

REFERENCE SIGNS LIST 7 ship handling device
10 joystick lever
13 GPS device
14 orientation sensor
Pt target coordinates
At target orientation
100 ship

The invention claimed is:

1. A ship handling device configured to make a ship move to target coordinates and turn to a target orientation based on a signal from a GPS device and a signal from an orientation sensor, wherein
the ship handling device is configured to
calculate the target coordinates and the target orientation based on an amount of operation on an operating tool,
set a movement control stop zone based on the target coordinates,
set a turn control stop zone based on the target orientation, make the ship move toward the target coordinates and turn to the target orientation after acquiring a signal finalizing the target coordinates and the target orientation, and
control the ship in such a manner that, when current coordinates calculated from the signal from the GPS device are in the movement control stop zone and a current orientation calculated from the signal from the orientation sensor is in the turn control stop zone, the current coordinates and the current orientation are maintained.

2. The ship handling device according to claim 1, wherein the ship handling device is configured to
display the current coordinates and the current orientation on a display device,
display the target coordinates and the target orientation on the display device in accordance with the amount of operation on the operating tool,
change the target coordinates displayed, in accordance with a movement of the ship, and
change the target orientation displayed, in accordance with a turning of the ship.

3. The ship handling device according to claim 1, wherein the ship handling device is configured to display one graphic representing the current coordinates and the current orientation, and to display another graphic representing the target coordinates and the target orientation.

4. The ship handling device according to claim 2, wherein the ship handling device is configured to display one graphic representing the current coordinates and the current orientation, and to display another graphic representing the target coordinates and the target orientation.

* * * * *